United States Patent [19]

Hanson et al.

[11] Patent Number: 4,903,502

[45] Date of Patent: Feb. 27, 1990

[54] RATE OF CHANGE TEMPERATURE CONTROL FOR TRANSPORT REFRIGERATION SYSTEMS

[75] Inventors: Jay L. Hanson, Bloomington; Doyle G. Herrig, Elko, both of Minn.

[73] Assignee: Thermo King Corporation, Minneapolis, Minn.

[21] Appl. No.: 236,875

[22] Filed: Aug. 26, 1988

[51] Int. Cl.$^4$ ............................................. F25B 49/00
[52] U.S. Cl. .................................... 62/228.5; 62/157; 62/229; 236/1 EA
[58] Field of Search .................. 62/160, 175, 157, 229, 62/228.4, 228.5, 231; 236/1 EA, 46 R, 46 F, 78 D; 340/558, 559; 165/12

[56] References Cited

U.S. PATENT DOCUMENTS

| | | | |
|---|---|---|---|
| 4,143,707 | 3/1979 | Lewis et al. | 62/160 |
| 4,265,299 | 5/1981 | Harnosh | 165/12 |
| 4,325,224 | 4/1982 | Howland . | |
| 4,338,791 | 7/1982 | Stamp, Jr. et al. | 62/160 |
| 4,345,714 | 8/1982 | Kojima . | |
| 4,419,866 | 12/1983 | Howland . | |
| 4,467,616 | 8/1984 | Kitauchi . | |
| 4,519,215 | 5/1985 | Barnett . | |
| 4,539,821 | 9/1985 | Tamura . | |
| 4,616,485 | 10/1986 | Gillett et al. . | |
| 4,663,725 | 5/1987 | Truckenbrod et al. . | |

FOREIGN PATENT DOCUMENTS 60-57143  4/1985  Japan .
60-134133 7/1985  Japan .

Primary Examiner—Harry B. Tanner
Attorney, Agent, or Firm—D. R. Lackey

[57] ABSTRACT

Methods and apparatus for controlling the load temperature of a transport refrigeration system to a selected set point temperature by operating modes which include a high capacity cooling mode and a lower capacity cooling mode. The rate of change of the load temperature is monitored by time and temperature integration when the lower capacity cooling mode is entered, to insure that the lower capacity cooling mode has adequate capacity to reduce the load temperature to set point within an acceptable period of time. If the set point temperature is not reached within a period of time which is a function of time, load temperature relative to set point, and the rate of change of load temperature relative to set point, a signal is provided which forces the system to the higher capacity cooling mode until the set point temperature is reached.

9 Claims, 4 Drawing Sheets

| MODE-TEMP. FALLING ↓ | DIGITAL SIGNAL MSB → LSB | | | | | | | | WORD # | TEMP. RE SET POINT | |
|---|---|---|---|---|---|---|---|---|---|---|---|
| | A | B | C | D | E | F | G | H | | | |
| | 0 | 0 | 0 | 0 | 0 | 0 | 0 | 0 | 1 | +27 | H.S. COOL NOT – IN RANGE |
| H.S. COOL NOT – IN RANGE | 0 | 1 | 0 | 1 | 1 | 1 | 1 | 1 | 95 | +6.7 | |
| | 0 | 1 | 1 | 0 | 0 | 0 | 0 | 0 | 96 | | H.S. COOL IN RANGE |
| | 0 | 1 | 1 | 0 | 0 | 1 | 1 | 1 | 103 | +5.0 | |
| | 0 | 1 | 1 | 0 | 1 | 0 | 0 | 0 | 104 | | L.S. COOL IN RANGE |
| | 0 | 1 | 1 | 0 | 1 | 1 | 1 | 1 | 111 | +3.4 | |
| | 0 | 1 | 1 | 1 | 0 | 0 | 0 | 0 | 112 | | |
| L.S. COOL IN RANGE | 0 | 1 | 1 | 1 | 0 | 1 | 1 | 1 | 119 | +1.7 | |
| | 0 | 1 | 1 | 1 | 1 | 0 | 0 | 0 | 120 | | L.S. HEAT IN RANGE |
| | 0 | 1 | 1 | 1 | 1 | 1 | 1 | 1 | 127 | SET POINT | |
| | 1 | 0 | 0 | 0 | 0 | 0 | 0 | 0 | 128 | | |
| L.S. HEAT IN RANGE | 1 | 0 | 0 | 0 | 0 | 1 | 1 | 1 | 135 | -1.5 | |
| | 1 | 0 | 0 | 0 | 1 | 0 | 0 | 0 | 136 | | |
| | 1 | 0 | 0 | 0 | 1 | 1 | 1 | 1 | 143 | -3.2 | H.S. HEAT NOT – IN RANGE |
| H.S. HEAT IN RANGE | 1 | 0 | 0 | 1 | 0 | 0 | 0 | 0 | 144 | | |
| | 1 | 0 | 0 | 1 | 1 | 1 | 1 | 1 | 159 | -6.5 | |
| H.S. HEAT NOT – IN RANGE | 1 | 0 | 1 | 0 | 0 | 0 | 0 | 0 | 160 | | |
| | 1 | 1 | 1 | 1 | 1 | 1 | 1 | 1 | 256 | -27 | |

DISABLE TIMER

COUNT = 1024 FOR RISE ONLY

COUNT = 8192 FOR RISE OR FALL

COUNT = 65536 FOR FALL ONLY

DISABLE TIMER

MODE-TEMP. RISING ↑

FIG. 4

RATE OF CHANGE TEMPERATURE CONTROL FOR TRANSPORT REFRIGERATION SYSTEMS

TECHNICAL FIELD

The invention relates in general to transport refrigeration systems, such as refrigeration systems for trucks, trailers and containers, and more specifically to temperature controllers, and methods of controlling the load temperature, of such systems.

BACKGROUND ART

Transport refrigeration systems for trailers and trucks have many different operating control arrangements for improving load temperature control while reducing fuel costs of the internal combustion engine, such as a Diesel engine, which commonly drives the refrigeration compressor. For example, it is common to employ a plurality of different heating and cooling modes, including high and lower capacity cooling modes, depending upon where the load temperature is relative to the set point temperature. In a cooling mode, in which the load requires cooling to maintain the set point, the hot gas output from the compressor is directed through a first fluid circuit which includes a condenser, expansion valve, and evaporator. In a heating mode, in which the load requires heating to maintain the set point, or in which the evaporator requires defrosting, the hot gas is directed through a second fluid circuit which by-passes the condenser and goes directly to an evaporator defrost pan heater and then through the evaporator.

To provide different heating and cooling capacities, it is common to operate the compressor at one of two different speeds, called high speed and low speed. Still additional capacity control may be provided by operating the compressor partially unloaded during the low speed heating and cooling modes.

In an effort to conserve fuel, when a shift from low speed to high speed is called for by the load temperature control, it is known to delay the change from low to high speed to insure that the requirement is not transitory. If the system is still calling for high speed heating or cooling after the time delay, then the shift to high speed is made. U.S. Pat. No. 4,325,224, which is assigned to the same assignee as the present application, sets forth examples of different heating and cooling modes, including partial heating and cooling modes via compressor unloading, and the use of time delays between low and high speed modes.

In a further effort to conserve fuel, instead of operating the compressor continuously, there are times when the compressor and its driving engine may be turned off for significant periods of time without deleteriously affecting load temperature. U.S. Pat. No. 4,419,866, which is assigned to the same assignee as the present application, discloses the alternative use of either continuous or start-stop compressor operating modes.

In all of the above arrangements for operating transport refrigeration systems, when the temperature controller reduces the cooling capacity as set point is approached, such as when switching from the high speed cooling mode to the low speed cooling mode, conditions may exist which will cause operation for an extended, unacceptable period of time in the reduced capacity mode before set point is reached; or the conditions may prevent set point from being reached. Such conditions include high ambient and improper loading of the served space. It is the object of the present invention to recognize when set point will not be reached by a reduced capacity cooling mode within an acceptable period of time, and to prevent extended operation in a lower capacity cooling mode.

DISCLOSURE OF THE INVENTION

Briefly, the present invention relates to rate of change control apparatus for monitoring and controlling the load temperature of a transport refrigeration system, and to methods of controlling the load temperature of such systems using rate of change of load temperature. When a temperature controller, in response to load temperature, changes the operating mode to a lower capacity cooling mode, either from a higher capacity cooling mode during a falling load temperature, or from set point during a rising load temperature, the present invention monitors the load temperature by time and temperature integration. If the rate of change of load temperature relative to the selected set point temperature is not within predetermined acceptable limits, a signal is provided which will force the temperature controller to switch to a higher capacity cooling mode, and to retain the higher capacity cooling mode until set point is reached.

BRIEF DESCRIPTION OF THE DRAWINGS

The invention will become more apparent by reading the following detailed description in conjunction with the drawings, which are shown by way of example only, wherein:

FIG. 4 is a diagram which sets forth an exemplary digital algorithm used by the logic of the schematic diagram shown in FIG. 3 to implement the teachings of the invention.

DESCRIPTION OF PREFERRED EMBODIMENTS

Concurrently filed application Ser. No. 236,878 filed in Aug. 26, 1988, entitled "Temperature Controller For A Transport Refrigeration System", which is assigned to the same assignee as the present application, discloses a temperature controller for transport refrigeration systems in which an analog ratio between the load temperature and the set point temperature is developed. The analog ratio is converted to a digital signal in a digital to analog converter. A logic array is programmed to provide predetermined output signals for controlling a transport refrigeration system, and the digital signal is also available at buffered outputs. The rate of change control of the present invention will be described as utilizing certain outputs provided by this temperature controller, and as providing an input for this temperature controller, and thus this concurrently filed application is hereby incorporated into the specification of the present application by reference. Also, since the construction of transport refrigeration systems per se is well known and not a part of the present invention, the hereinbefore mentioned U.S. Pat. Nos.

4,325,224 and 4,419,866, which describe exemplary transport refrigeration systems, are also incorporated into the present specification by reference.

Figure 1:
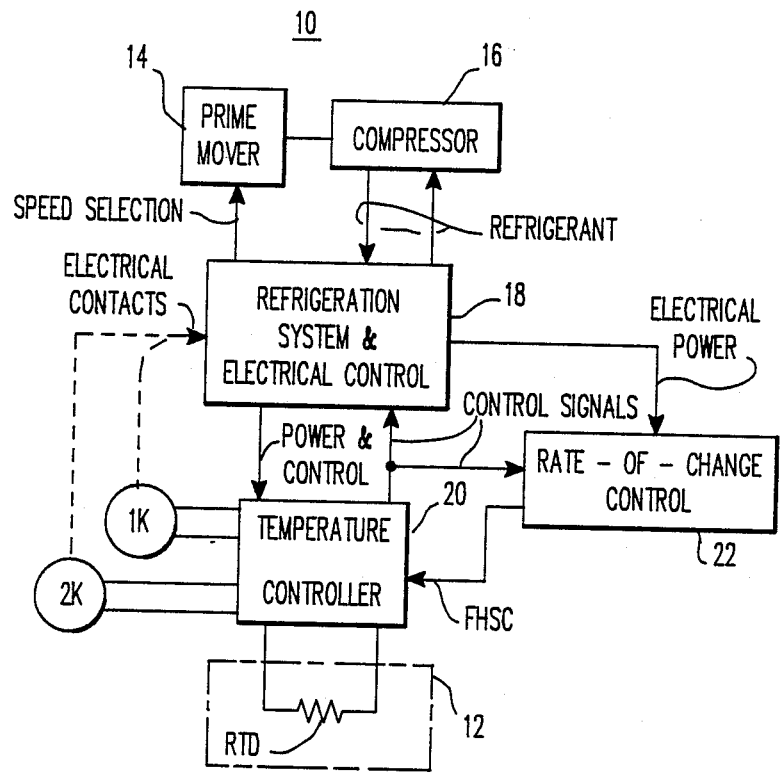
FIG. 1 is a block diagram of a transport refrigeration system constructed according to the teachings of the invention.

Referring now to the drawings, and to FIG. 1 in particular, there is shown a transport refrigeration system 10 for conditioning the air in the served space 12 of a truck, trailer, refrigerated container, and the like. Refrigeration system 10 includes a prime mover 14, such as a Diesel engine, which is operable in continuous or start-stop modes, at a selected one of high and low speeds, such as 2200 RPM and 1400 RPM, as disclosed in the incorporated patents. The prime mover 14 drives a refrigerant compressor 16 for a refrigeration unit 18 which includes refrigeration components and electrical control. A temperature controller 20, which may be the controller in the incorporated concurrently filed application, responds to a sensor RTD disposed in the served space 12, and to electrical power and control signals from unit 18, to provide control signals for the operation of unit 18, as well as for operating heat and speed relays 1K and 2K, respectively. Heat relay 1K, when de-energized, has electrical contacts in unit 18 which select a cooling mode, and when energized it has contacts which select a heating mode. Speed relay 2K, when energized, has contacts in unit 18 which select the high speed mode for prime mover 14, and the low speed mode when de-energized. While solenoid control of compressor unloader ports may also be used to further reduce cooling capacity as set point is approached, for purposes of example the present invention will be described with two stages of cooling capacity, high speed cool, which is selected when the speed relay 2K is energized and the heat relay is de-energized, and low speed cool, which is selected when the speed relay 2K and the heat relay 1K are both de-energized.

Temperature controller 20 operates in response to load temperature, changing between predetermined heating and cooling modes in response to the temperature of the load in the served space 12 relative to a selected temperature set point. This type of temperature control is usually entirely adequate, and can hold load temperature close to the selected set point. There are occasions, however, when the temperature controller 20 switches to a lower capacity cooling mode, such as from a higher capacity cooling mode during a falling load temperature, and from set point during a rising load temperature, where the lower capacity is not sufficient to bring the load temperature to set point. If the load temperature remains between set point and the load temperature which will cause controller 20 to switch to a higher capacity cooling mode, then the refrigeration system 10 will operate for extended periods without actually bringing the load temperature down to the desired set point temperature. The present invention is a rate of change controller 22, shown in block form in FIG. 1, and in a detailed schematic diagram in FIG. 2, which operates in conjunction with temperature controller 20. The rate of change controller 22, in response to control signals from temperature controller 20 and electrical power from refrigeration control 18, provides a signal FHSC for temperature controller 20, which, when true, forces the temperature controller 20 to switch to a higher capacity cooling mode, notwithstanding that the load temperature is not at a level which would ordinarily cause the temperature controller 20 to select the higher capacity mode. Further, once the rate of change controller 22 provides a true signal FHSC, temperature controller 20 will maintain the higher capacity cooling mode until the load temperature reaches set point. Signal FHSC is provided as a function of time, load temperature, and rate of change of load temperature. The closer the load temperature is to set point, the longer the period of time before a true signal FHSC will be provided. The timing starts when the lower capacity cooling mode is entered, and the monitoring by the rate of change controller 22 then continues by time and temperature integration, in conjunction with the rate of change of the load temperature, until set point is reached normally by the lower capacity cooling mode, or until set point is reached by forcing the system to a higher capacity cooling mode in response to a true signal FHSC.

Referring for a moment to FIG. 4, temperature controller 20 provides an 8-bit digital signal A-H, with bit A being the MSB, and bit H being the LSB. Digital signal A-H indicates the load temperature relative to set point, with the digital conversion from an analog ratio of load temperature to set point being half way through the conversion at set point, i.e., at word #128. Temperature controller provides the digital signal A-H as output signals, via appropriate buffers, and the rate of change controller of the present invention utilizes the MSB "A", and the fourth and fifth bits "D" and "E", respectively. Temperature controller also provides a true "in-range" signal IR, which is true or a logic one when the load temperature is close to set point, e.g., words #112 through #159 for a falling load temperature, and words #135 through #96 for a rising load temperature. Temperature controller 20 also provides a true signal HT when a heating mode is selected. The in-range signal IR and the heat signal HT are also utilized by rate of change controller 22.

Figure 2:
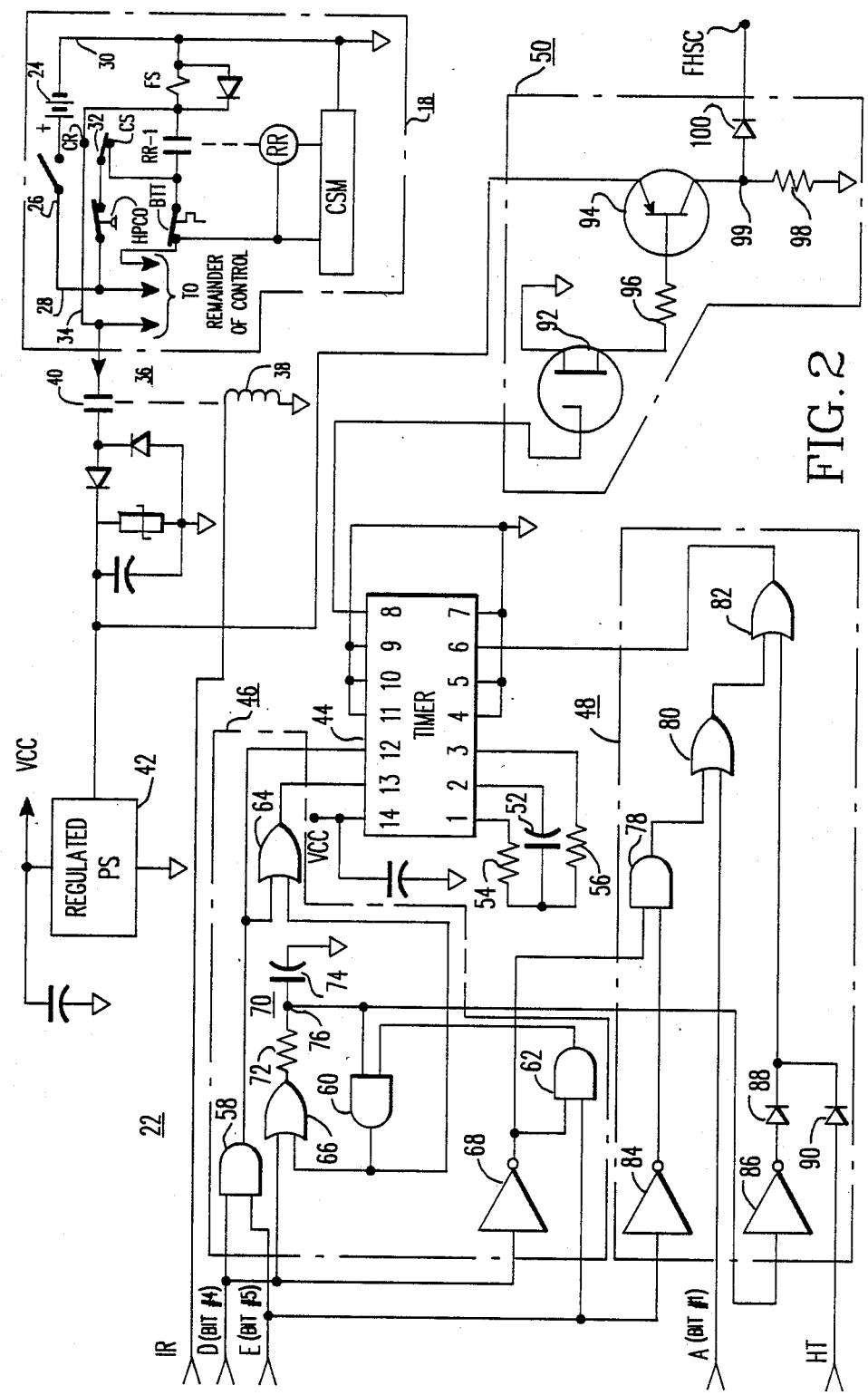
FIG. 2 is a detailed schematic diagram of a rate of change controller which may be used for that function shown in block form in FIG. 1.

Referring now to FIG. 2, a portion of the electrical control for refrigeration unit 18 is shown, in order to illustrate how rate of change controller 22 obtains electrical power. A battery 24 and an on-off switch 26 power electrical conductors 28 and 30, with conductor 30 being chassis ground. A selector switch 32 selects either a continuous-run mode CR, in which the prime mover 14 runs continuously, or a start-stop mode CS, in which the prime mover 14 is turned on and off. In the continuous run mode, a fuel solenoid FS for prime mover 14 receives power directly from the battery 24 via the on-off switch 26. In the start-stop mode, the fuel solenoid FS is under the control of a start-stop control module CSM and a run relay RR which has a set of normally open contacts RR-1. In the start-stop mode, when the prime mover 14 is started, run relay RR is energized to close its contacts RR-1 which provides electrical power for fuel solenoid FS from conductor 28 via a normally closed high pressure cut out switch HPCO, position CS of selector switch 32, and contacts RR-1. Contacts RR-1, when closed, also provides electrical power to conductor 34. Conductor 34 is utilized to provide electrical power to rate of change controller 22., Co-pending application Ser. No. 236,887, filed Aug. 26, 1988, U.S. Pat. No. 4,878,465, entitled "Control For Automatically Starting a Diesel Engine" may be referred to if more details of the start-stop mode of operating prime mover 14 are desired.

More specifically, the power supply for rate of change controller 22 is responsive to power being applied to conductor 34, to insure that the prime mover 14 is running, and it is responsive to the load temperature being "in-range", as signified by a true signal IR. A relay 36 having an electromagnetic coil 38 and normally open contacts 40 has its coil 38 connected to be energized only when the in-range signal IR is true. When these conditions exist, relay contacts 40 close to connect conductor 34 to a regulated power supply 42, such as an LM2931, which provides a +5 volt control voltage VCC for the circuitry of rate of change controller 22.

Figure 3:
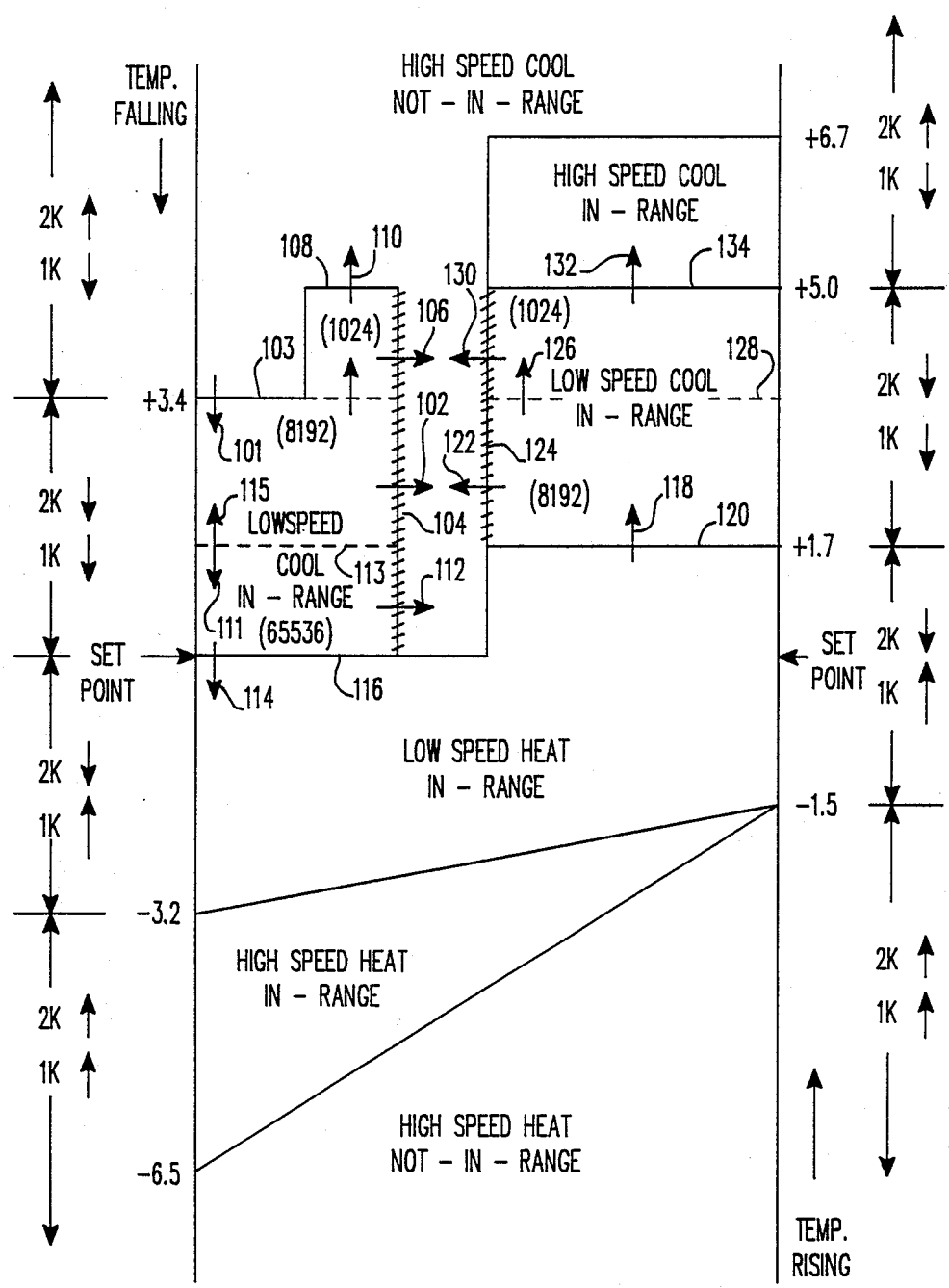
FIG. 3 is a diagram which sets forth basic cooling and heating modes performable by the rate of change controller of the invention.

During the following description of rate of change controller 22, the diagram of FIG. 3 and the algorithm of FIG. 4 will also be referred to. The diagram of FIG. 3 illustrates the heating and cooling modes which temperature controller 20 will provide when selector switch 32 selects the continuous mode position 32 for prime mover 14, and it illustrates a modification thereof provided by the present invention. If the start-stop position CS of selector switch 32 is selected, it does not change the modifications provided by the present invention, as it basically would change the low speed heat, in-range operating mode to a mode referred to as "null", as the prime mover would be turned off in this mode. A falling load temperature is indicated by starting at the top of the diagram in FIG. 3 and proceeding downwardly along the left-hand side. A rising load temperature is indicated by starting at the bottom of the diagram and proceeding upwardly along the right-hand side. The energized and de-energized conditions of the speed and heat relays 2K and 1K, respectively, are indicated for each of the heating and cooling modes, with an upwardly pointed arrow indicating the associated relay is energized, and a downwardly pointing arrow indicating that it is de-energized.

FIG. 4 sets forth a digital algorithm which shows the values of the digital signal which will trigger the different heating and cooling modes, with the modification of the invention being illustrated along the left-hand side.

Returning now to FIG. 2, rate of change controller 22 includes a programmable timer 44, with National Semiconductor's CD4541 being used for purposes of example, first logic means 46 for programming the timing period of timer 44, second logic means 48 for controlling a reset pin of timer 44, and an output driver 50 for providing a true signal FHSC when timer 44 reaches the end of a programmed timing period and times out.

An external capacitor 52 and external resistors 54 and 56 operate with an integrated oscillator in timer 44 to provide a clock for incrementing the count of timer 44 when reset pin #6 is low. A high or logic one on reset pin #6 resets and clears timer 44. Pins #12 and #13 program the timing period of timer 44. When the logic levels of pins #12 and #13 are zero-zero (0—0), respectively, a count of 8192 is selected, 0-1 selects a count of 1024, 1-0 selects a count of 256, and 1-1 selects a count of 65536. When the currently selected timing period times out, i.e., the programmed count is reached, pin #8 goes from logic zero to a logic one, and it stays at the logic one level until the reset pin #6 is switched from low to high.

The first logic means 46 includes AND gates 58, 60, and 62, OR gates 64 and 66, an inverter gate 68, and an RC circuit 70 which includes a resistor 72 and capacitor 74. AND gate 58 has two inputs responsive to the fourth and fifth bits D and E of the digital signal A-H provided by temperature controller 20, with the output of AND gate 58 being connected to programming pin #12 of timer 44, and to an input of OR gate 64. The output of OR gate 64 is connected to the remaining programming pin #13 of timer 44.

The fourth bit D also provides inputs for OR gate 66 and inverter gate 68. The output of OR gate 66 is connected to the resistor 72 of RC circuit 70, and the junction 76 between resistor 72 and capacitor 74 provides inputs for AND gate 60 and the second logic means 48.

The fifth bit E also provides inputs for AND gate 62 and the second logic means 48. The output of inverter gate 68 provides the remaining input to AND gate 62, and an input to the second logic means 48. The output of AND gate 62 provides the remaining input to AND gate 60, and the output of AND gate 60 provides the remaining inputs to OR gates 64 and 66.

The second logic means 48 includes an AND gate 78, OR gates 80 and 82, inverter gates 84 and 86, and isolation diodes 88 and 90. AND gate 78 has two inputs, one responsive to the inverted level of the fourth bit D, as provided by inverter gate 68, and one responsive to the inverted level of the fifth bit E, as provided by inverter gate 84. The output of AND gate 78 is applied to one of the inputs of OR gate 80. The remaining input of OR gate 80 is responsive to the level of the most significant bit A of the digital signal A-H. The output of OR gate 80 provides an input to OR gate 82. The remaining input to OR gate 82 is responsive to the heat signal HT from temperature controller 20, and also the inverted level of junction 76 via inverter gate 86. The output of OR gate 82 controls the level of the reset pin #6 of timer 44.

The output driver 50 includes a FET 92 which is turned on when output pin #8 of timer 44 goes high to signify that the programmed count has been accumulated, which in turn provides gate drive for a PNP transistor 94 via a resistor 96. The emitter of transistor 94 is connected to receive power from conductor 34 of control 18 when relay 36 is energized, and the collector of transistor 94 is connected to ground via a resistor 98. The junction 99 between transistor 94 and resistor 98 provides output signal FHSC via a diode 100.

In the operation of rate of change controller 22, it will first be assumed that the prime mover 14 is driving compressor 16 in the high speed cool, not in range mode, and that the load temperature is being reduced towards the selected set point temperature. The in-range signal IR provided by temperature controller 20 will not be true, preventing the energization of coil 38 of relay 36, and thus rate of change controller 22 will be inactive.

When the load temperature drops to word #112, as indicated in FIG. 4, and as indicated in FIG. 3 by arrow 101 crossing line 103 signal IR will become true, relay 36 will be energized, and power supply 42 will provide power to the remaining circuits of rate of change controller 22. The fifth bit E will be a logic one and the fourth bit D will be a logic zero. AND gate 58 will thus apply a logic zero to an input of OR gate 64 and to programming pin #12 of timer 44. AND gate 62 will apply a logic zero to AND gate 60, AND gate 60 will apply a logic zero to the remaining input of OR gate 64, and OR gate 64 will apply a logic zero to programming pin #13 of timer 44. The timing period of timer 44 is thus programmed to a count of 8192.

Junction 76 of RC circuit 70 was at the logic zero level, resulting in inverter gate 86 applying a logic one to OR gate 82, which in turn applied a logic one to reset pin #6 of timer 44, holding it in the reset condition. With the change to word #112, the output of OR gate 66 goes high, which charges capacitor 74 at the rate of the RC time constant. Thus, when junction 70 reaches the logic one level, inverter gate 86 changes the logic level applied to OR gate 82 to a logic zero. Inverter gate 68 now outputs a logic zero to AND gate 78, and AND gate 78 applies a logic zero to OR gate 80. Bit A of the digital signal A-H is at the logic zero level, and thus OR gate 80 applies a logic zero to the remaining input of OR gate 82. The output of OR gate 82 thus switches from a logic one to a logic zero after the RC time delay, and it releases timer 44 to accumulate a count of positive going transitions of the timer clock. Words #112 through #119 provide a temperature range or band which maintains the programmed count of 8192. If the cooling capacity of the low speed cool mode is not adequate to lower the load temperature to word #120, but it is adequate to keep the temperature in the band defined by words #112-119, timer 44 will accumulate a count until the count reaches 8192, at which time pin #8 of timer 44 will go high. This will turn FET 92 on, which turns transistor 94 on, to provide a true or high signal FHSC. Signal FHSC is part of an algorithm in temperature controller 20 which will switch the refrigeration system to high speed cool when the refrigeration system is already in a cooling mode and above the set point. The algorithm then maintains the high speed cooling mode until set point is reached. This entry to high speed cool from the temperature band defined by words #112-119 is indicated by arrow 102 passing through the vertical line 104. The cross hatched vertical line 104 indicates time-out of timer 44.

If the load temperature, after initially entering the temperature band defined by words #112-119 from word #111, now rises back into a temperature band defined by words #104-111, timer 44 is re-programmed to time out after accumulating a count of only 1024. Timer 44 will retain any count accumulated in the temperature band defined by words #112-119. Thus, when timer 44 is re-programmed to the lower count, if the count already accumulated equals or exceeds the lower count, timer 44 will immediately time out and force the system into the high speed cool mode. This is indicated by arrow 106 crossing line 104. If the accumulated count has not reached 1024 when the new temperature band is entered, then an accumulation of count equal to 1024 will force high speed cool when it occurs; or, high speed cool could occur before then if the load temperature should rise fast enough to cross line 108 into the high speed cool range, indicated by arrow 110, before timer 44 times out. But should the load temperature stall in the band defined by words #104-111, timer 44 will time out more quickly than if the load temperature stalled in the band defined by words #112-119.

More specifically, when the load temperature rises from word #112 to word #111 the fourth bit D changes from a logic one to a logic zero, the fifth bit E changes from a logic zero to a logic one, and AND gate 58 applies a logic zero to programming pin #12. AND gates 62 and 60 now each have two logic one inputs, changing their outputs to logic ones and causing OR gate 64 to apply a logic one to programming pin #13. This logic arrangement of 01 on pin #12 and pin #13, respectively, re-programs timer 44 to the count of 1024.

If the cooling capacity of the low speed cool mode is sufficient to lower the load temperature into the temperature band defined by words #120-127, indicated by arrow 111 crossing broken line 113, before timer 44 reaches the count of 8192, timer 44 is re-programmed to a count of 65536, greatly extending the period of time required before timer 44 will time out. Any count accumulated in other temperature bands before the load temperature entered the band defined by words #120-127 will remain on timer 44. Count 65536 thus represents the maximum acceptable time that the system will be allowed to remain in the low speed cool mode before the rate of change control 22 will force the system to the high speed cool mode. Should the count of 65536 be reached before the load temperature reaches set point, the system will be forced to the high speed cool mode, indicated by arrow 112 crossing vertical line 104. If the cooling capacity was sufficient to lower the load temperature to set point, word 128, before timer 44 reached count 65536, then temperature controller 20 will switch to the low speed heat, in-range mode, indicated by arrow 114 crossing line 116. If the load temperature, after crossing into the temperature band associated with count 65536 should rise back into the band associated with count 8192, indicated by arrow 115 crossing line 113, timer 44 will be re-programmed back to count 8192.

More specifically, when the load temperature drops into the band defined by words #120-127, the fourth and fifth bits D and E will both be at the logic one level and AND gate 58 will apply a logic one to programming pin #12. AND gate 58 will also apply a logic one to an input of OR gate 64, and the output of OR gate 64 will switch high, applying a logic one to programming pin #13. The two logic one signals on the programming pins selects the count of 65536.

When the load temperature reaches set point, word #128, timer 44 is reset. Signal HT, indicating a heating mode, will reset timer 44 when it goes high, via OR gate 82. If heat is locked out, the MSB, bit A, of the digital signal A-H, upon going to a logic one at set point, will reset timer 44 via OR gates 80 and 82. When set point is reached bits D and E will both be logic zero, applying logic ones to both inputs of AND gate 78 via inverter gates 68 and 84. The high output of AND gate 78 will reset timer 44 via OR gates 80 and 82. A lack of a charge on capacitor 74 will also reset timer 44, via inverter gate 86 and OR gate 82.

If the lower capacity cool mode is entered in response to a rising temperature, as indicated by arrow 118 crossing line 120, instead of in response to a falling temperature, the rate of change controller 22 will be energized, and when the mode changes from heat to cool, timer 44 will be released to start counting toward a programmed count of 8192. If the load temperature stalls in the band defined by words #112-119, timer 44 will time out and force high speed cool, as indicated by arrow 122 crossing cross hatched vertical line 124. If the load temperature rises into the temperature band defined by words #104-111 before timer 44 reaches a count of 8192, indicated by arrow 126 crossing broken line 128, then timer 44 will be re-programmed to a count of 1024. If timer 44 times out at count 1024, high speed cool will be forced, as indicated by arrow 130 crossing vertical line 124. If the load temperature rises fast enough to reach the load temperature which will normally cause a switch to the high speed cool mode before timer 44 times out, indicated by arrow 132 crossing line 134, then temperature controller 20 will switch to high speed cool on its own.

It will be understood that the temperature bands selected relative to set point to change the count required for timer 44 to time out, and thus combine rate of change with time-temperature integration, is for purposes of example only. The temperature bands may be increased in number to the point where each word is a new temperature band causing a new time out count to be used for each word, which could be easily implemented by using a microprocessor instead of discrete logic devices.

In summary, there has been disclosed a new rate of change temperature controller, and method of controlling load temperature, which forces a temperature controller of a transport refrigeration system to switch to a higher capacity cooling mode, notwithstanding that the temperature controller would normally switch between cooling modes based upon load temperature alone. The invention thus recognizes that a lower capacity cooling mode may not always provide sufficient capacity to reach a selected set point temperature, and it provides a method and apparatus for dynamically determining an acceptable period of time to allow the system to remain in the lower capacity cooling mode before forcing a switch to a higher capacity cooling mode. The dynamic evaluation and determination of time is based upon time and temperature integration, in conjunction with rate of load temperature change. This evaluation provides a time which is inversely proportional to the different between load temperature and set point, forcing a switch to a higher capacity cooling mode in a relatively short time when the load temperature remains in a temperature band remote from set point, while providing a longer period of time when the load temperature is reduced to a temperature band close to set point.

What is claimed is:

1. A method of controlling the load temperature of a transport refrigeration system to a selected set point temperature, by operating modes which include a high capacity cooling mode and a lower capacity cooling mode, comprising the steps of:

switching between the higher capacity cooling mode and the lower capacity cooling mode at predetermined load temperatures relative to set point, starting a timer having a programmable time-out period when the operating mode changes to the lower capacity cooling mode, monitoring the load temperature relative to set point during the lower capacity cooling mode, programming the time-out period of the timer in response to predetermined differences between the load temperature and set point, with the length of the time-out period varying indirectly with the magnitude of the predetermined difference temperature, said monitoring step including the step of providing a control signal when set point is not reached within a period of time after entering the lower capacity cooling mode which is a function of time and load temperature relative to set point, and to the programmed time-out period of the timer, and forcing a change from the lower capacity cooling mode to the higher capacity cooling mode in response to said control signal.

2. The method of claim 1 including the step of continuing to add time to previously accumulated time notwithstanding changes in the time-out period by the programming step.

3. The method of claim 1 including the step of:
maintaining the lower capacity cooling mode once it has been triggered and entered from the high capacity cooling mode, notwithstanding an increase in load temperature to a value higher than the trigger temperature,
and wherein the programming step reduces the time-out period of the timer when the trigger temperature is exceeded.

4. The method of claim 1 including the steps of:
continuing the higher capacity cooling mode until set point is reached, when the higher capacity cooling mode was forced by the forcing step,
and resetting the timer when set point is reached.

5. The method of claim 1 wherein the programming step includes the steps of:
setting the time-out period of the timer to a first predetermined value when the starting step starts the timer in response to a change from the high capacity cooling mode to the lower capacity cooling mode,
setting the time-out period of the timer to a second predetermined value, longer than the first, when the load temperature drops to a predetermined value relative to set point,
and setting the time-out period of the timer to a third predetermined value, shorter than the first, when the load temperature increases to a predetermined value relative to set point.

6. The method of claim 6 including the steps of successively setting the time-out periods of the timer to the second, first and third values in response to a rising temperature in which the timer starting step started the timer in response to the lower capacity cooling mode being entered from the set point.

7. The method of claim 1 including the step of providing a compressor and prime mover having first and second operating speeds, with the high and lower capacity cooling modes being provided by the first and second operating speeds, respectively, of the compressor and prime mover.

8. Rate-of-change control apparatus for monitoring and controlling the load temperature of a transport refrigeration system having different capacity cooling modes, to insure that operation at a lower capacity cooling mode is adequate to reduce the load temperature to a selected set point temperature within an acceptable period of time, comprising:
timer means having a programmable time-out period,
means activating said timer means when a predetermined lower capacity cooling mode is entered,
means programming the time-out period of said timer means to provide different time-out periods in predetermined different temperature bands above set point, with the time-out period of each temperature band being responsive to the location of the temperature band relative to set point, increasing as the temperature bands become closer to set point,
and means responsive to the timing out of the timer means for switching the transport refrigeration system from the lower capacity cooling mode to the high capacity cooling mode.

9. The rate-of-change control apparatus of claim 8 wherein the timer means, after time-out, remains in the timed out condition until set point is reached, and including means for resetting the timer means when set point is reached.

* * * * *